(12) United States Patent
Lai et al.

(10) Patent No.: US 12,492,999 B2
(45) Date of Patent: Dec. 9, 2025

(54) OPTICAL INSPECTION EQUIPMENT FOR CHECKING MULTIPLE UTENSILS MADE OF PLANT FIBERS

(71) Applicants: Changzhou city cheng xin environmental protection technology Co., Ltd, Changzhou (CN); Gatos Vision, Incorporated, Los Gatos, CA (US)

(72) Inventors: Tzung-shen Lai, Changzhou (CN); Chin-Yee Lin, Changzhou (CN); Shih-Ping Wei, Changzhou (CN)

(73) Assignees: Changzhou city chang xin environmental protection technology Co., Ltd, Changzhou (CN); Gatos Vision, Incorporated., Los Gatos, CA (US)

( * ) Notice: Subject to any disclaimer, the term of this patent is extended or adjusted under 35 U.S.C. 154(b) by 137 days.

(21) Appl. No.: 18/375,552

(22) Filed: Oct. 1, 2023

(65) Prior Publication Data

US 2025/0110061 A1   Apr. 3, 2025

(51) Int. Cl.
*G01N 21/95*  (2006.01)
*G01N 35/04*  (2006.01)

(52) U.S. Cl.
CPC ............ *G01N 21/95* (2013.01); *G01N 35/04* (2013.01)

(58) Field of Classification Search
CPC .............................. G01N 21/95; G01N 35/04
See application file for complete search history.

(56) References Cited

U.S. PATENT DOCUMENTS

2014/0110314 A1\* 4/2014 Higuchi ............... B07C 5/3416
348/92

\* cited by examiner

Primary Examiner — Tony Ko

(57) ABSTRACT

Optical inspection equipment for checking multiple utensils made of plant fibers contains: a delivery device, at least one light source, and at least one shooting device. The delivery device includes a carrier on which at least one transparent zone is defined, the at least one shooting device includes a first shooting device, the at least one light source includes a first light source, such that the first light source illuminates a respective one utensil to be translucent and the first shooting device shoots an image of the respective one utensil via the transparent zone of the carrier. Alternatively, the first light source illuminates the respective one utensil to be translucent via the transparent zone of the carrier and the first shooting device shoots the image of the respective one utensil directly.

5 Claims, 15 Drawing Sheets

OPTICAL INSPECTION EQUIPMENT FOR CHECKING MULTIPLE UTENSILS MADE OF PLANT FIBERS

TECHNICAL FIELD

The present invention relates to optical inspection equipment for checking multiple utensils made of plant fibers, and more particularly to the optical inspection equipment which illuminates the multiple utensils to be translucent, and the images of the multiple utensils are shot by the first camera to judge and check interior and structural defects of the multiple utensils.

BACKGROUND

Conventional optical inspection equipment is applied to shoot images of products by using at least one camera, and then the images are compared with a standard image to check defects of the products.

Referring to FIG. 12, conventional optical inspection equipment is applied to check defects of outer surfaces and inner surfaces of the multiple utensils (such as multiple cup lids 1) made of plant fibers, and the optical inspection equipment contains a first transport belt 91 and a second transport belt 92 arranged along a delivering direction sequently, wherein a shape of the first transport belt 91 and the second transport 92 is circular, a discharge segment 911 of the first transport belt 91 extends below the second transport belt 92, the second transport belt 92 has multiple suction orifices defined around a bottom thereof, a sucking device 921 fixed in the second transport belt 92 and configured to vacuumize the multiple suction orifices of the bottom of the second transport belt 92, wherein the first transport belt 91 has a first shooting device 931 arranged on a top thereof, the first shooting device 931 is configured to shoot an image of the outer surface of a respective one utensil 1, the second transport belt 92 has a second shooting device 932 arranged therebelow and configured to shoot images of inner surfaces of the multiple utensils 1. In operation, a mouth of the respective one utensil 1 faces downward, and the respective one utensil 1 is delivered by the first transport belt 91. When the respective one utensil 1 is delivered above the discharge segment 911 by the first transport belt 91, a suction orifice of a respective one second transport belt 92 draws the respective one utensil 1, and the respective one utensil 1 is delivered by the second transport belt 92.

However, such optical inspection equipment has defects as follows:

1) The optical inspection equipment is merely applied to check a defect of the outer surface and an inner surface of the respective one utensil, wherein the defect of the outer surface contains dirty, unclear patterns, damage, and structural defect, and the defect of the inner surface contains dirty, unclear patterns, damage, and structural defect. In other words, an interior defect (such as crack, uneven thickness, air bores, too thin or thick thickness) of the respective one utensil 1 cannot be checked.

2) To shoot the image of the inner surface of the respective one utensil 1, the suction orifice of the bottom of the second transport belt draws the top of the respective one utensil 1 so that the second shooting device 932 shoots the inner surface of the respective one utensil 1. Unfortunately, the respective one utensil 1 of various shapes cannot be drawn securely.

For example, as shown in FIG. 13, the respective one utensil is a cup lid 94 made of plant fibers and includes a cap 941, a peripheral fringe 942 extending downward, and a C-shaped protrusion 943 formed on the cap 941, wherein a vertical height of the C-shaped protrusion 943 is more than a top plane of the cap 941, so the cap 94 cannot be drawn to the second transport belt 92.

Referring to FIG. 14, a utensil 95 is a cup lid which is made of plant fibers and includes a recessed portion 951 defined on a top of the utensil 95, an orifice 952 formed on the recessed portion 951, a flip cap 953 connected on a side of the orifice 952, wherein a profile of the orifice 952 corresponds to a profile of the flip cap 953. The utensil 95 further includes a protrusion 954 formed thereon and having a longitudinal height higher than a top plane of the flip cap 953, and multiple tear-off fringes 955 spacedly defined between the flip cap 953 and the orifice 952. Since the protrusion 954 is higher than a top of the utensil 95, the flip cap 953 will broke, after the utensil 95 is drawn on the second transport belt 92 and the protrusion 954 is pushed, thus snapping the flip cap 953 downward.

As shown in FIG. 15, the utensil is a sundae cup 96 made of plant fibers, and the sundae cup 96 includes a lid 961, an annular fringe 962 formed on a peripheral side of the sundae cup 96, and a recessed portion 963 formed on a recessed top of the lid 961. Due to an area of a top of the sundae 96 is small, a negative pressure producing in the recessed portion 963 cannot draw the sundae cup 96 on the second transport belt 92, thus dropping the sundae cup 96 from the second transport belt 92.

The present invention has arisen to mitigate and/or obviate the afore-described disadvantages.

SUMMARY

The primary aspect of the present invention is to provide optical inspection equipment which is configured to check the defect of the inner surface and interior defect of multiple utensils made of plant fibers in various shapes.

To obtain above-mentioned aspect, optical inspection equipment provided by the present invention contains: the optical inspection equipment contains: a delivery device configured to deliver the multiple utensils made of the plant fibers, at least one light source, a first shooting device and a second shooting device.

The delivery device includes a carrier on which at least one transparent zone is defined, the at least one shooting device includes a first shooting device, the at least one light source includes a first light source located on a side of the carrier, and the first shooting device is located on the other side of the carrier, such that the first light source illuminates a respective one utensil to be translucent and the first shooting device shoots an image of the respective one utensil via the transparent zone of the carrier. Also, the second shooting device shoots the image of the inner surface of the respective one utensil via the transparent zone of the carrier. Thereby, the optical inspection equipment is capable of checking the defect of the inner surface and interior defect of multiple utensils in various shapes.

DETAILED DESCRIPTION

Figure 1:
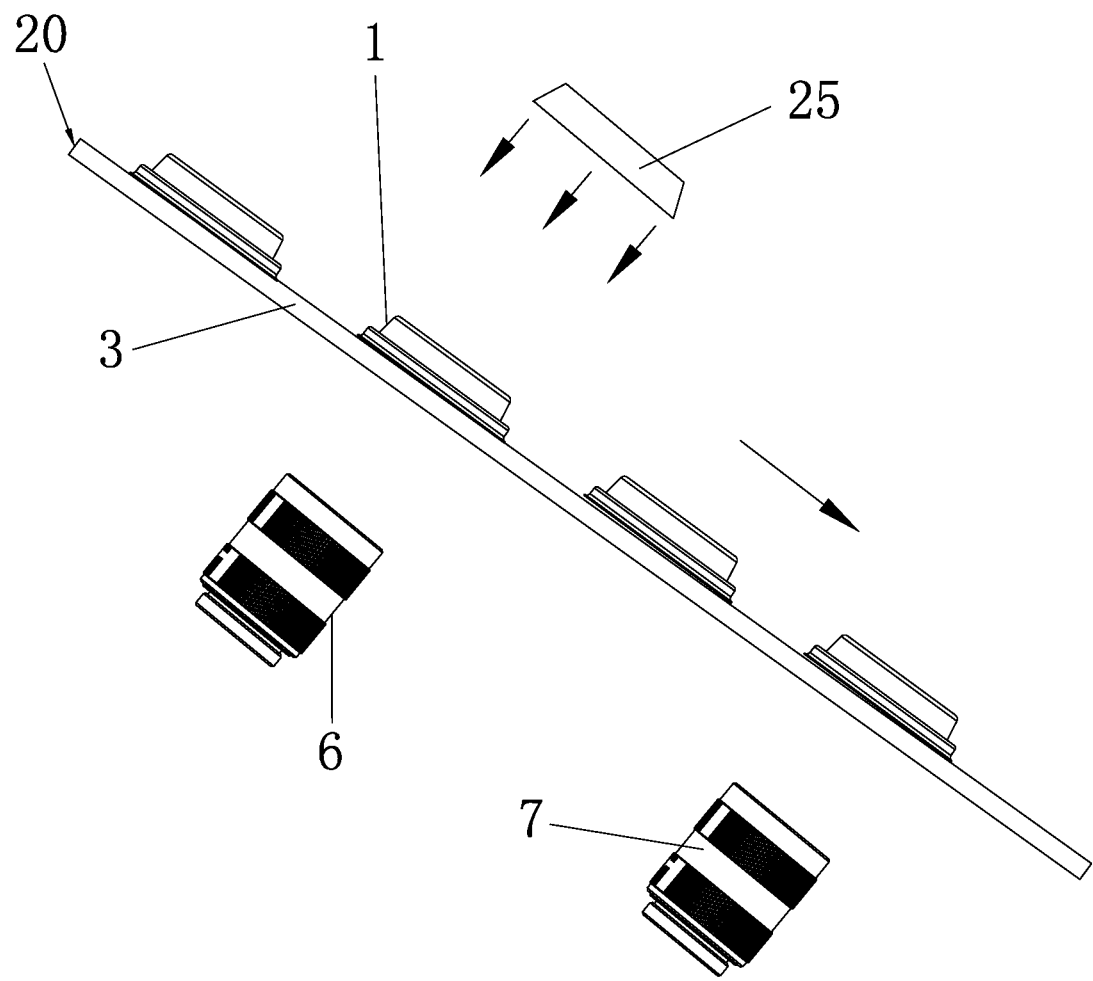
FIG. 1 is a schematic view showing optical inspection equipment according to a preferred embodiment of the present invention.

With reference to FIG. 1, optical inspection equipment for checking multiple utensils made of plant fibers according to a preferred embodiment of the present invention, in following embodiments, the multiple utensils are a cup lid 1, and the optical inspection equipment comprises: a delivery device configured to deliver the multiple utensils made of the plant fibers, at least one light source and at least one shooting device. Since the delivery device is well-known art, further remarks are omitted. The delivery device includes at least one carrier 20 on which at least one transparent zone is defined, the at least one shooting device includes a first shooting device 6, the at least one light source includes a first light source 25 located on a side of a respective one carrier 20, and the first shooting device 6 is located on the other side of the respective one carrier 20. In other words, the first light source 25 and the first shooting device 6 are spaced by the respective one carrier 20, such that the first light source 25 illuminates a respective one utensil 1 to be translucent, then the first shooting device 6 shoots an image of the respective one utensil 1 to judge whether an interior defect, a defect of an inner surface or/and an outer surface of the respective one utensil 1 occur, wherein the at least one shooting device further includes a second shooting device 7 configured to shoot an image of the inner surface of the respective one utensil 1 via the transparent zone of the respective one carrier 20. Thereby, the optical inspection equipment is capable of checking the inner surface of the respective one utensil 1 and structure of the respective one utensil 1 in various shapes.

The at least one carrier 20 is one carrier or multiple carriers arranged on multiple workstations or be applicable for different objects, for example, the objects are on the at least one carrier 20 to be delivered to next workstation, wherein the at least one carrier 20 is driven by a power apparatus or drops the objects freely.

Referring to FIG. 1, the optical inspection equipment according the preferred embodiment of the present invention comprises: a carrier 20 fixed on a delivery device, a first light source 25, a first shooting device 6, and a second shooting device 7. The carrier 20 is a tilted slideway 3 configured to drop the multiple utensils 1 freely, thus obtaining easy structure and not being driven by a power apparatus. The carrier 20 of the delivery device includes at least one transparent zone, wherein the first light source 25 is arranged on a portion of the carrier 20 above the multiple utensils 1, the first shooting device 6 is arranged on another portion of the carrier 20 which is not located below the multiple utensils 1 and faces the first light source 25, and the second shooting device 7 is arranged on the other portion of the carrier 20 which is not located on the multiple utensils 1.

The tilted slideway 3 is a plate obliquely fixed on the delivery device and is made of transparent material, such as a transparent glass. Alternatively, the tilted slideway 3 is a partially transparent plate by defining a transparent zone on the tilted slideway 3.

In operation, the multiple utensils 1 are delivered below the first light source 25 so as to be illuminated by the first light source 25, the multiple utensils 1 are translucent and are put in the transparent zone of the carrier 20, the first shooting device 6 shoots the image of the respective one utensil 1 via the transparent zone of the carrier 20, and the second shooting device 7 shoots the image of the inner surface of the respective one utensil 1 via the transparent zone of the carrier 20.

Figure 2:
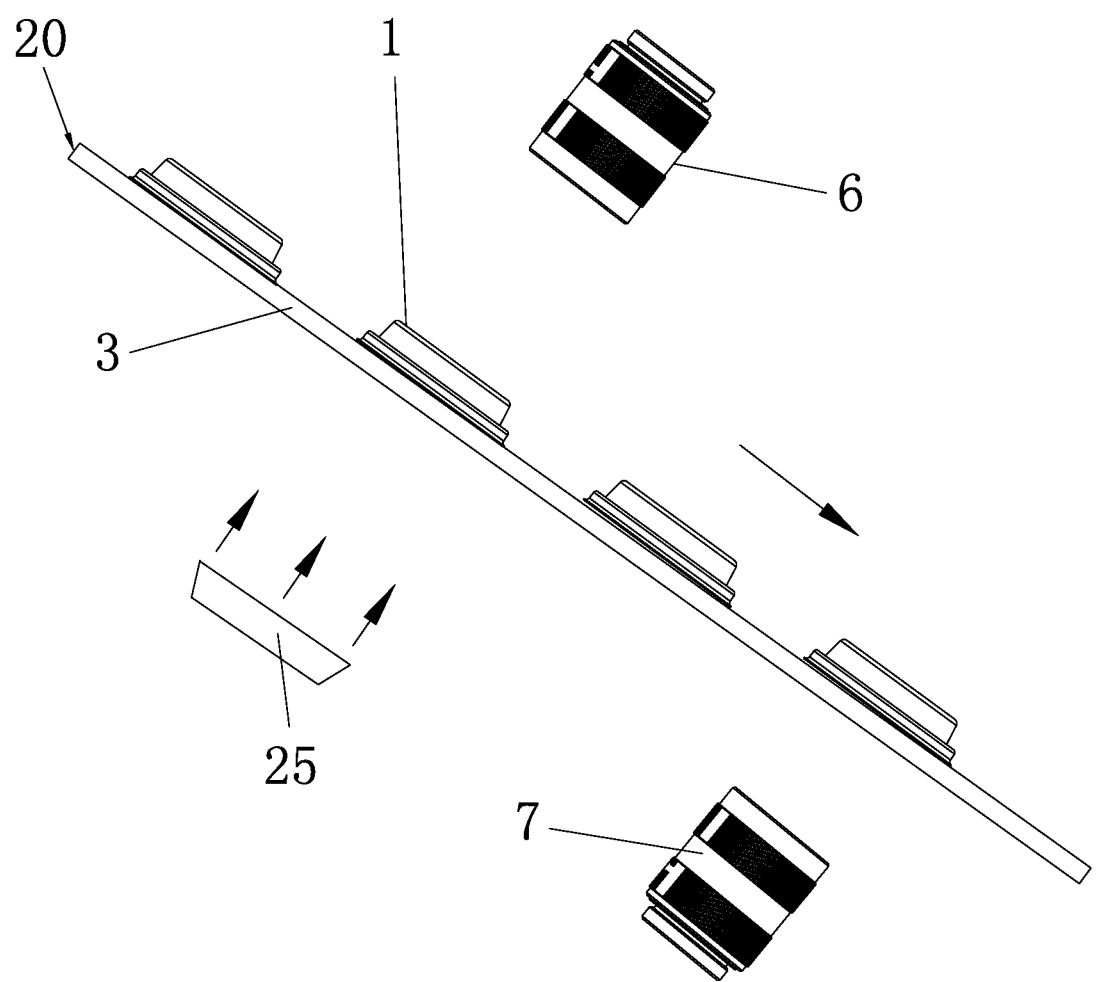
FIG. 2 is a schematic view showing optical inspection equipment according to another preferred embodiment of the present invention.

As shown in FIG. 2, in another embodiment, the first shooting device 6 is arranged above a portion of the carrier 20 which is configured to put the multiple utensils 1, and the first light source 25 is arranged on the other portion of the carrier 20 which is not configured to put the multiple utensils 1. In operation, the light source 25 passes through the transparent zone of the carrier 20, and the multiple utensils 1 above the transparent zone of the carrier 20 are illuminated by the first light source 25 to be translucent, wherein the first shooting device 6 shoots the image of the respective one utensil 1, and the second shooting device 7 shoots the image of the inner surface of the respective one utensil 1 via the transparent zone of the carrier 20.

Figure 3:
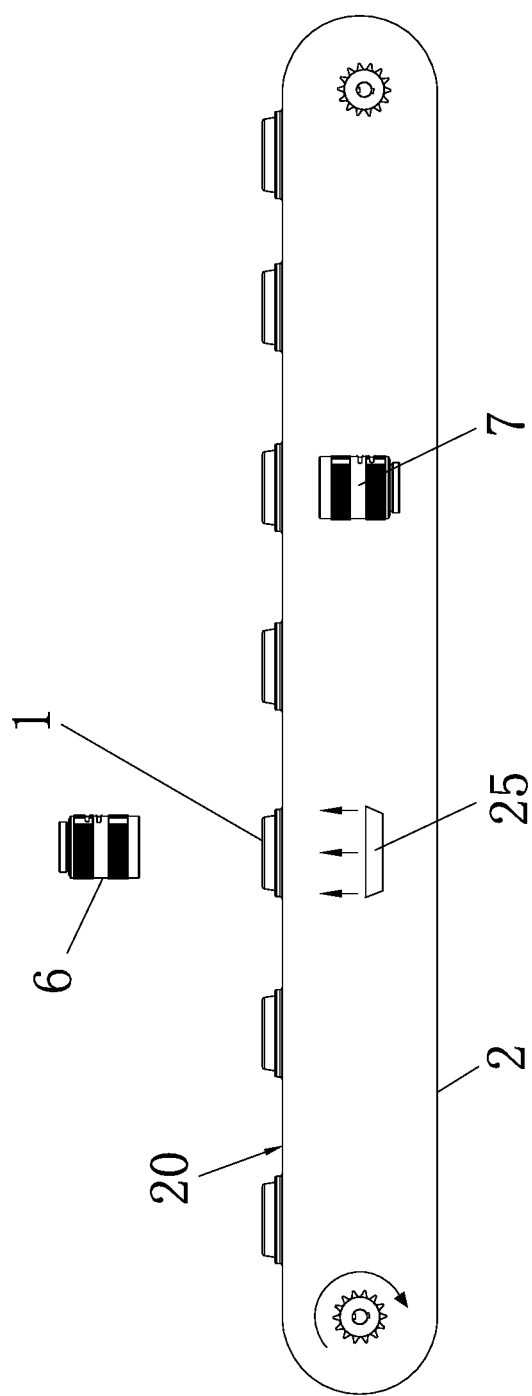
FIG. 3 is a schematic view showing optical inspection equipment according to another preferred embodiment of the present invention.

As illustrated in FIG. 3, in another embodiment, the carrier 20 of the delivery device is a first transport belt 2 surrounding the carrier 20, wherein the first transport belt 2 includes a transparent zone, the first light source 25 is arranged on an inner side of the first transport belt 2 on which the multiple utensils 1 are not put, and the first shooting device 6 is arranged on an outer side of the first transport belt 2 on which the multiple utensils 1 are put, and the first shooting device 6 is located above the first light source 25, wherein the second shooting device 7 is mounted on the inner side of the first transport belt 2 on which the multiple utensils 1 are not put.

The first transport belt 2 is made of transparent material, and the transparent material is transparent polyurethane (PU) or transparent silicone rubber, so the first transparent belt 2 is completely transparent. In another embodiment, the first transport belt 2 is partially transparent by defining the transparent zone on the first transport belt 2.

Figure 4:
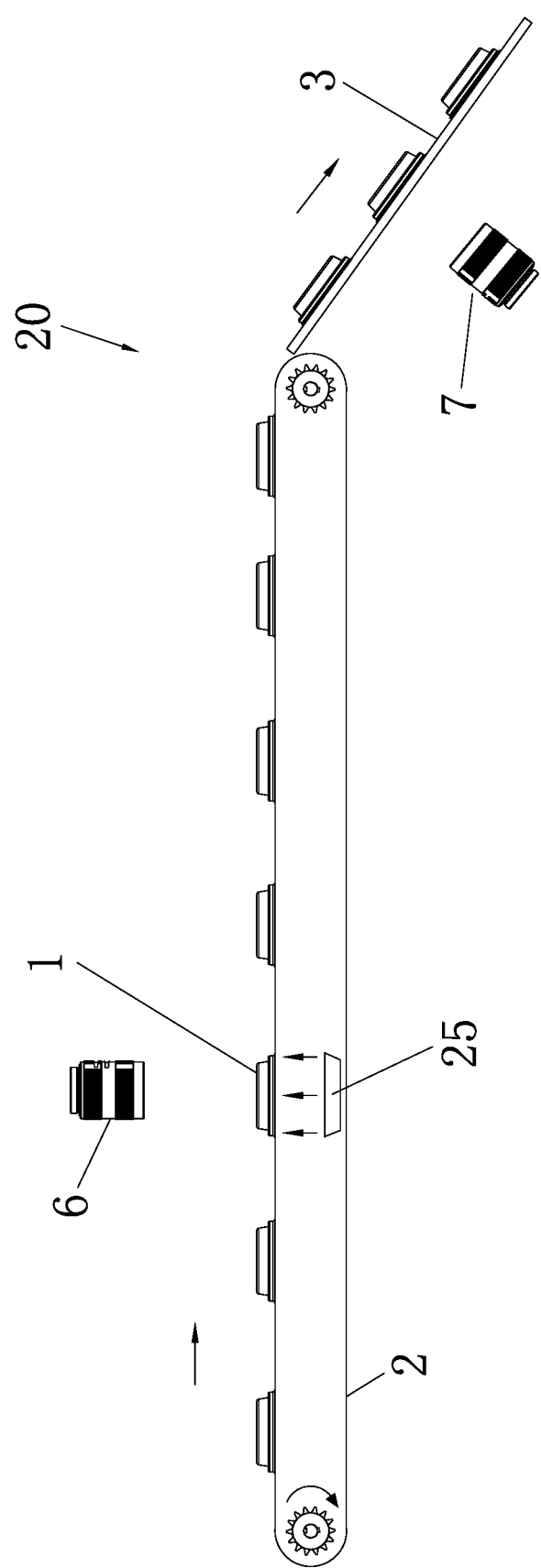
FIG. 4 is a schematic view showing optical inspection equipment according to another preferred embodiment of the present invention.

With reference to FIG. 4, in another embodiment, the carrier 20 of the delivery device is comprised of the first transport belt 2 and the tilted slideway 3, wherein the first transport belt 2 is located on a feeding side of the tilted slideway 3, and the first transport belt 2 and the tilted slideway 3 include the transparent zone, the first light source 25 is arranged on an inner side of the first transport belt 2 on which the multiple utensils 1 are not put, and the first shooting device 6 is arranged on the outer side of the first transport belt 2 on which the multiple utensils 1 are put, and the first shooting device 6 is located above the first light source 25, wherein the second shooting device 7 is arranged below a portion of the tilted slideway 3 on which the multiple utensils 1 are not put.

In operation, the multiple utensils 1 are delivered on the first transport belt 2, when one of them multiple utensils 1 on the first transport belt 2 is moved above the first light source 25, the first light source 25 passes through the transparent zone of the first transport belt 2 to illuminate the one utensil 1 to be translucent, then the first shooting device 6 shoots the image of the respective one utensil 1, and the first transport belt 2 delivers and outputs the multiple utensils 1 continuously to the tilted slideway 3, then the second shooting device 7 shoots the image of the inner surface of the respective one utensil 1 via the transparent zone of the tilted slideway.

Figure 5:
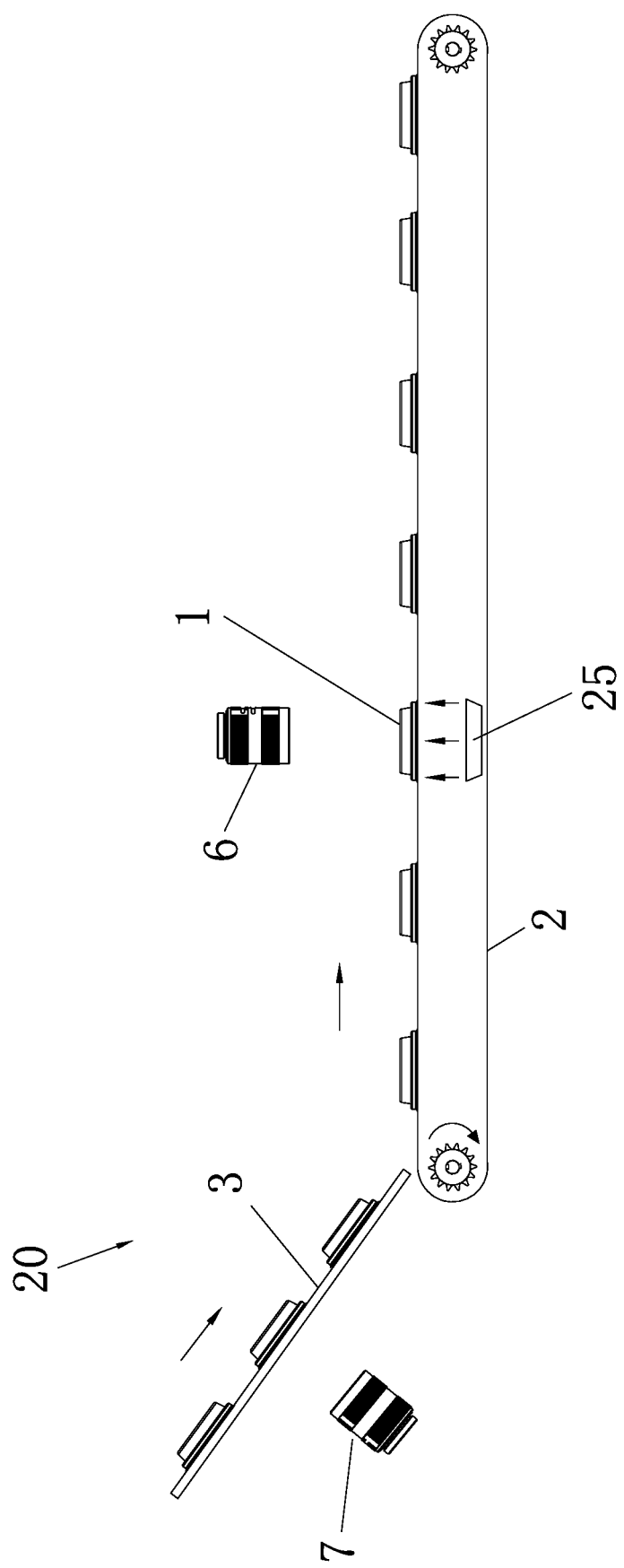
FIG. 5 is a schematic view showing optical inspection equipment according to another preferred embodiment of the present invention.

Referring to FIG. 5, in another embodiment, the first transport belt 2 of the carrier 20 of the delivery device is arranged on a discharge side of the tilted slideway 3.

Figure 6:
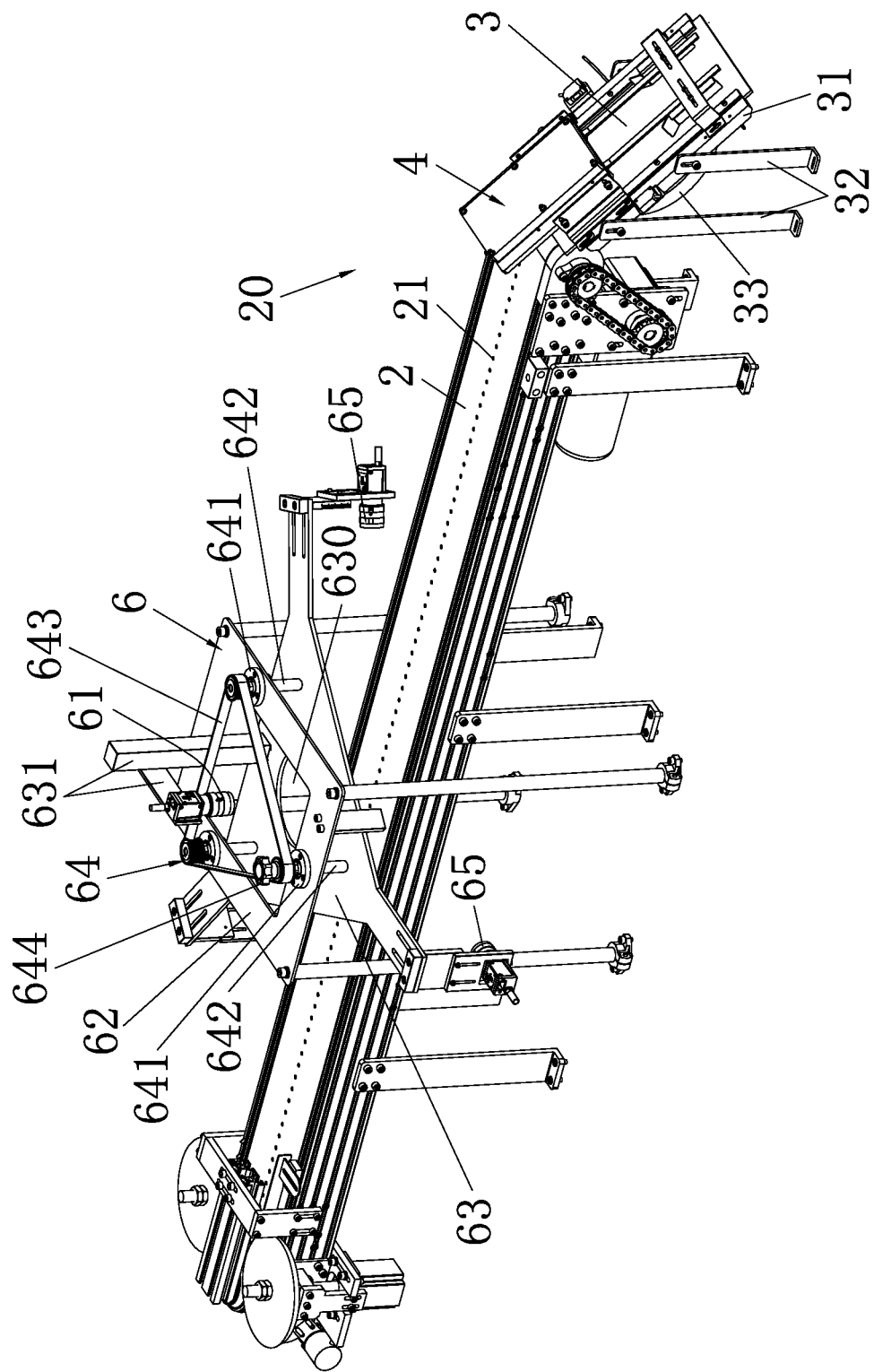
FIG. 6 is a perspective view of FIG. 4.
Figure 7:
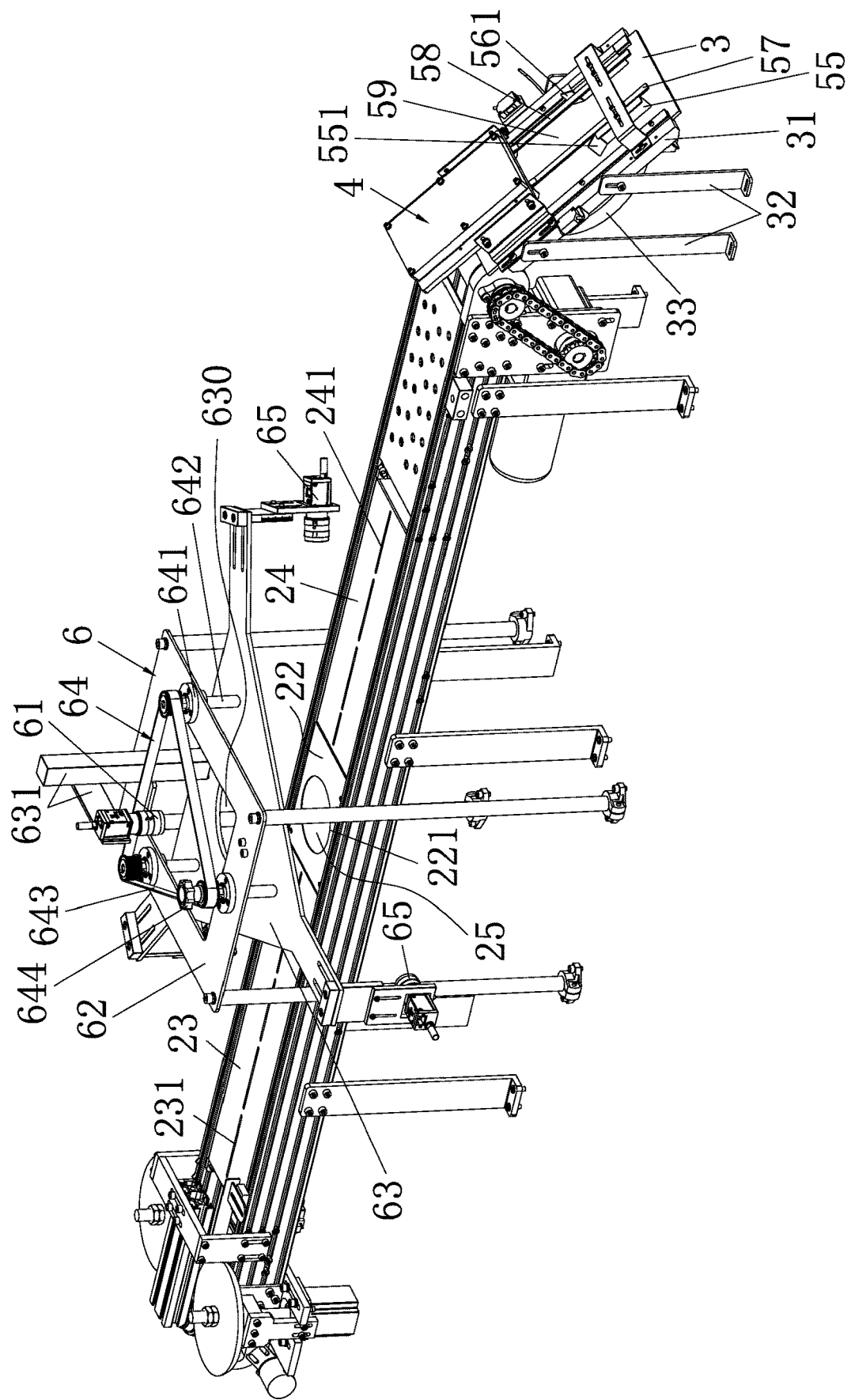
FIG. 7 is a perspective view of FIG. 6 without the first transport belt.

As shown in FIGS. 6 and 7, the carrier 20 of the delivery device is comprised of the first transport belt 2 and the tilted slideway 3, the first transport belt 2 is located on a feeding side of the tilted slideway, and the first transport belt 2 and the tilted slideway 3 have the transparent zone, wherein the first light source 25 is arranged on the inner side of the first transport belt 2 on which the multiple cups 1 are not put, and the first shooting device 6 is arranged on the outer side of the first transport belt 2 and is located above the first light source 25, wherein the second shooting device 7 (see FIG. 9) is arranged below the tilted slideway 3 on which the multiple utensils 1 are not put.

With reference to FIGS. 6-10, the first transport belt 2 includes multiple suction orifices 21 spacedly formed on a top thereof, the first transport belt 2 includes a shielding plate 22 mounted above the first light source 25, and the shielding plate 22 includes a through orifice 221 defined thereon, such that the first light source 25 illuminates lights to the multiple utensils 1 via the through orifice 221 and the transparent zone of the first transport belt 2, so the lights are limited to illuminates within a profile range of the multiple utensils 1, and the lights of the first light source 25 do not interfere a shooting result of the first shooting device. The first transport belt 2 includes a suction device which has at least one casing 23, 24, and the at least one casing 23, 24 is arranged on two sides of the first light source 25, wherein the at least one casing 23, 24 has at least one drawing hole defined thereon and configured to connect with an air sucking device, such as an vacuum or an exhaust fan. The at least one casing 23, 24 have at least one elongated hole 231, 241 extending from a top thereof along a delivery direction of the multiple utensils 1, wherein the at least one elongated hole 231, 241 is a kidney slot and is located below the multiple suction orifices 21, such that the multiple suction orifices 21 of the first transport belt 2 suck and vacuum the multiple utensils 1, thus avoiding an offset or movement while delivering the multiple utensils 1.

The tilted slideway 3 is arranged on a frame 31, the frame 31 includes multiple support racks 32 connected on two sides thereof, and the tilted slideway 3 includes an air blowing device 4 located on an outer wall of a top thereof, such that when the multiple utensils 1 are moved to the tilted slideway 3, the air blowing device 4 forces the multiple utensils 1 to matingly contact with the tilted slideway 3, thus dropping the multiple utensils 1 freely and avoiding a removal of the multiple utensils 1 from the tilted slideway 3.

The tilted slideway 3 includes a direction guide structure 5 disposed on an outer wall thereof and configured to guide the multiple utensils 1 to drop freely. Since a greater inertia produces when the multiple utensils 1 are delivered by the first transport belt 2, the multiple utensils 1 remove from the tilted slideway 3 easily before moving to the tilted slideway 3. Thus, the air blowing device 4 is configured to avoid the removal of the multiple utensils 1 from the tilted slideway 3, and the direction guide structure 5 is configured to guide the multiple utensils 1, thus preventing the offset of the multiple utensils 1 from the tilted slideway 3.

Figure 8:
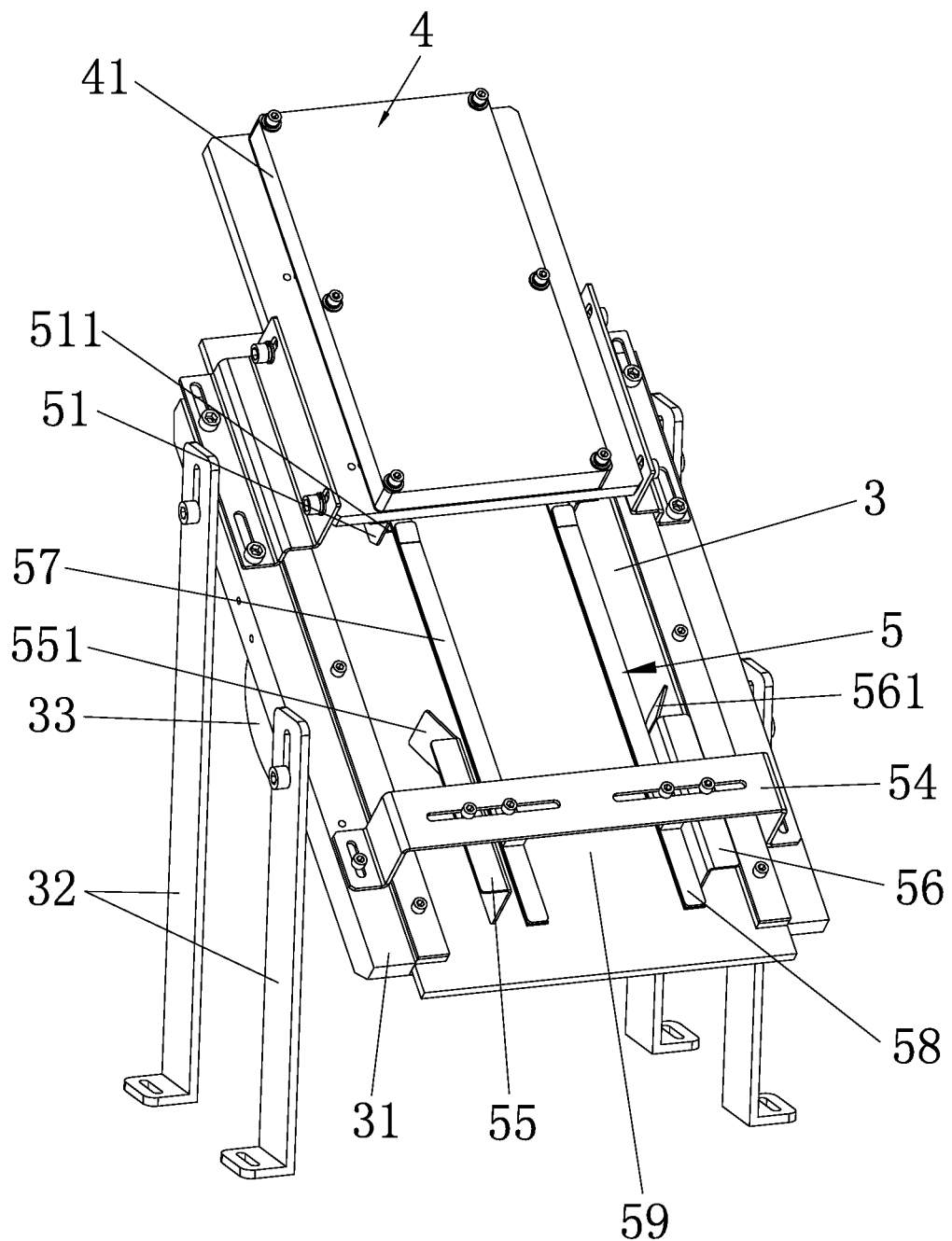
FIG. 8 is a perspective view of a tilted slideway of the optical inspection equipment according to the preferred embodiment of the present invention.
Figure 9:
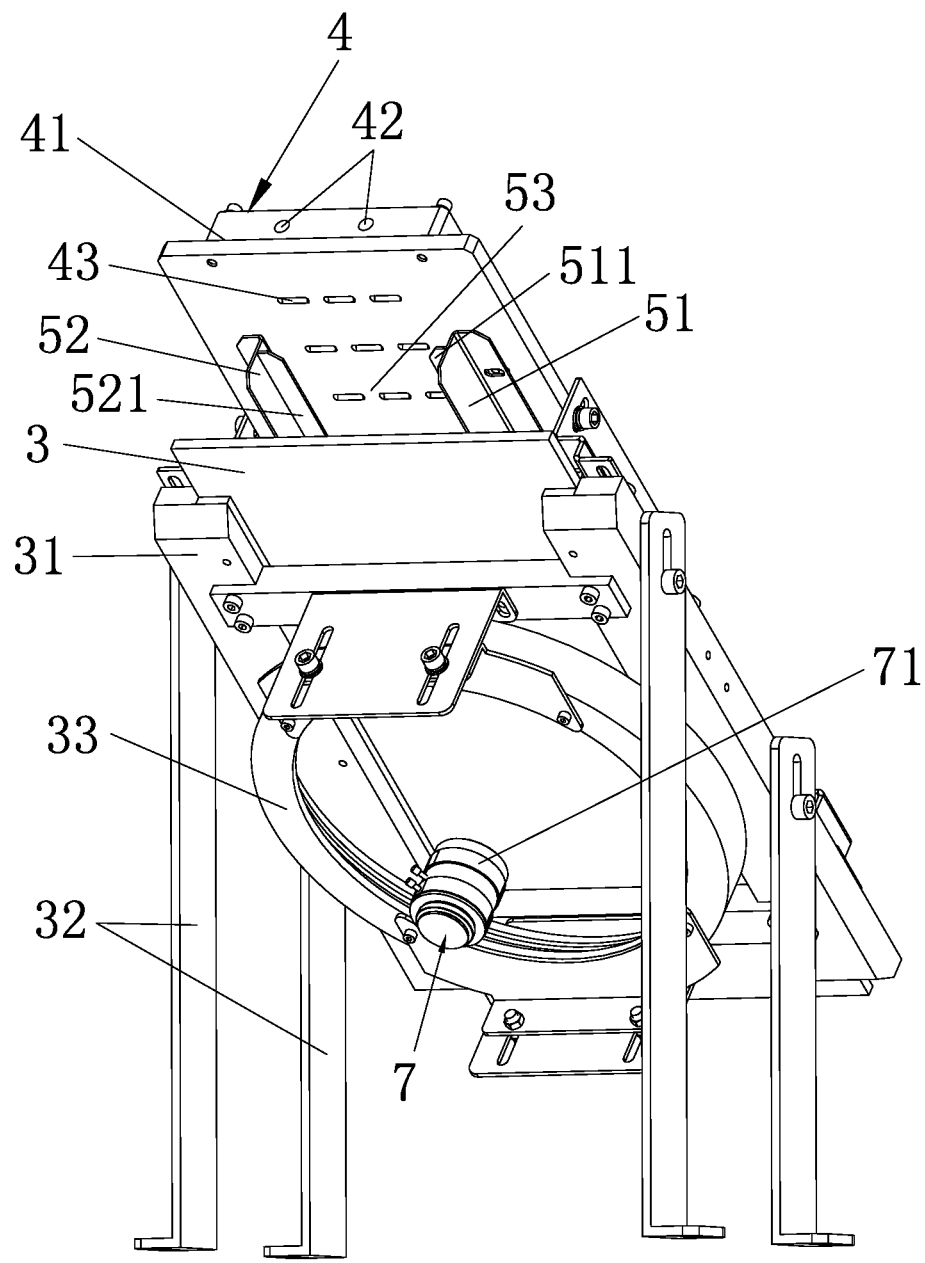
FIG. 9 is another perspective view of a tilted slideway of the optical inspection equipment according to the preferred embodiment of the present invention.

Referring to FIGS. 8 and 9, the air blowing device 4 includes a hollow cavity 41, at least one air inlet 42 defined on the hollow cavity 41 and configured to connect an air supply device, such as a blower or an air compressor. The tilted slideway 3 includes multiple air blowing orifices 43 spacedly defined on a bottom of the hollow cavity 41, such that the multiple air blowing orifices 43 blow airs to tops of the multiple utensils 1 so that the multiple utensils 1 matingly contact with the tilted slideway 3 to drop freely and not to remove from tilted slideway 3.

The direction guide structure 5 includes a first guiding plate 51 and a second guiding plate 52 which are fixed on the bottom of the hollow cavity 41 separately, and the multiple air blowing orifices 43 of the air blowing device 4 are defined between the first guiding plate 51 and the second guiding plate 52, wherein the first guiding plate 51 has at least one first upward conducting sheet 511, and the second guiding plate 52 has at least one second upward conducting sheet 521. The tilted slideway 3, the hollow cavity 41, the first guiding plate 51, the second guiding plate 52, the first upward conducting sheet 511, and the second upward conducting sheet 521 define a first guide channel 53. A fixing plate 54 is configured to position two third guiding plates 55, 56 and two third upward conducting sheets 57, 58 on an wall of a bottom of the tilted slideway 3, wherein the two third upward conducting sheet 57, 58 are defined between the two third guiding plates 55, 56, one third guiding plate 55 has a first beveled piece 551 extending from a top thereof, the other third guiding plate 56 has a second beveled piece 561 extending from a top thereof, and the fixing plate 54 is connected with the frame 31. A top of one third upward conducting sheet 57 extends above the first upward conducting sheet 511, and a top of the other upward conducting sheet 58 extends above to the second upward conducting sheet 521, wherein the tilted slideway 3, the two third guiding plates 55, 56, and the two third upward conducting sheets 57 define a second guide channel 59. The multiple utensils 1 on the tilted slideway 3 move across the first guide channel 53 and the second guide channel 59 so that the multiple utensils 1 drop freely and exactly to avoid the offset and an overturn.

Figure 10:
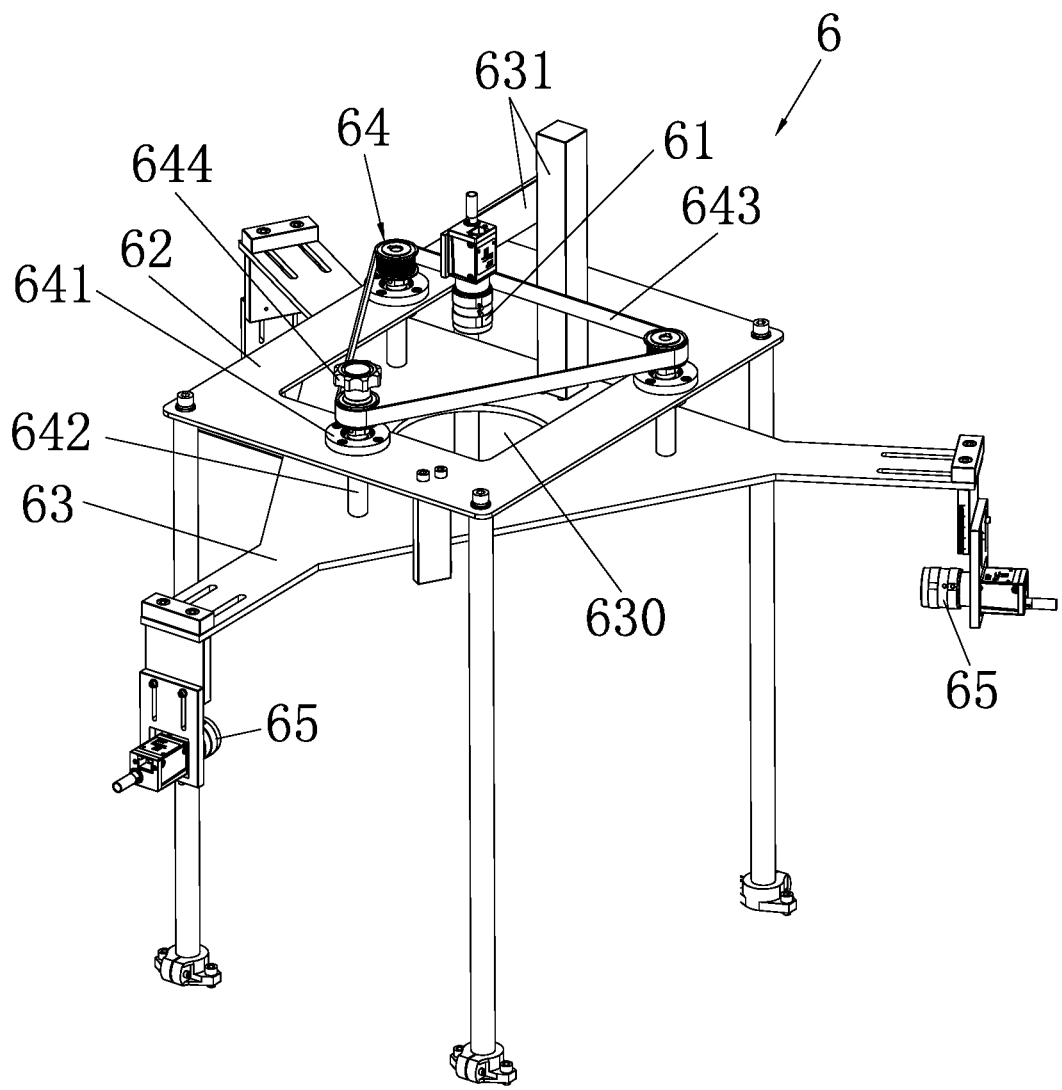
FIG. 10 is a perspective view of a first shooting device of the optical inspection equipment according to the preferred embodiment of the present invention.

Referring to FIG. 10, the first shooting device 6 includes a first camera 61 configured to shoot an image of a top of a respective one utensil 1, a locating deck 62, and a vertical moving deck 63. The locating deck 62 is connected with the vertical moving deck 63 by using an adjustment mechanism 64, wherein the adjustment mechanism 64 includes multiple bearing holders 641 mounted on the locating deck 62, wherein each bearing holder 641 has a upright shaft 642 movably connected therein, and a bottom of the upright shaft 642 is fixed on the vertical moving deck 63. The upright shaft 642 has a timing belt 643 fitted thereon, and timing belts 643 of the multiple bearing holders 641 are connected to obtain synchronous adjustment. One upright shaft 642 of the adjustment mechanism 64 has a rotatable knob 644 fixed on a top thereof and configured to be rotated to adjust a position and a height of the vertical moving deck 63, the vertical moving deck 63 has an opening 630 defined on a center thereof, and the vertical moving deck 63 has at least one bracket 631 configured to position the first camera 61 above the opening 630. The vertical moving deck 63 has multiple second cameras 65 configured to shoot an image of an external side of the respective one utensil 1, such that the rotatable knob 644 of the adjustment mechanism 64 is rotated to adjust the positions and the heights of the vertical moving deck 63, the multiple second cameras 65, and the first camera 61, wherein the first camera 61 and the second camera 65 of the first shooting device 6 shoot the image of the respective one utensil 1 to be translucent.

Referring to FIGS. 4 and 9, the second shooting device 7 is arranged below the tilted slideway 3 on which the multiple utensils 1 are not put. The second shooting device 7 includes a third camera 71 located below the frame 31, a circular light source 33 is configured to illuminate the multiple utensils 1 dropping from the tilted slideway 3 sequently, hence the third camera 71 shoots the image clearly.

Figure 11:
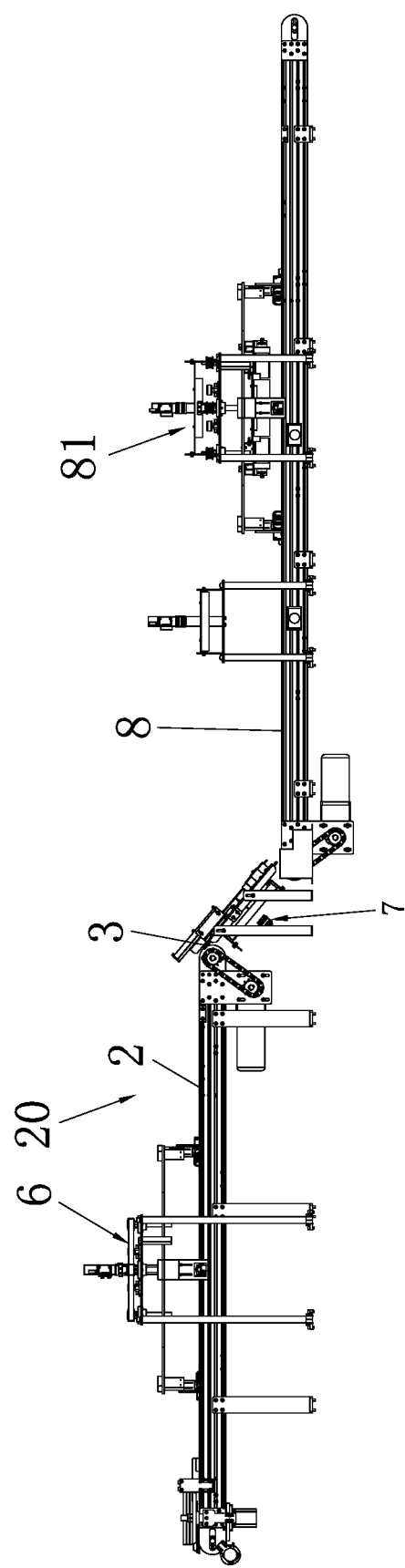
FIG. 11 is a schematic view showing optical inspection equipment according to another preferred embodiment of the present invention.
Figure 12:
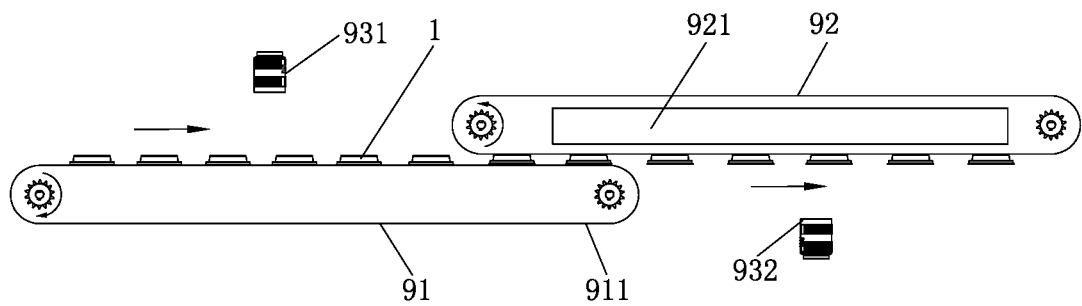
FIG. 12 is a schematic view of conventional optical inspection equipment.
Figure 13:
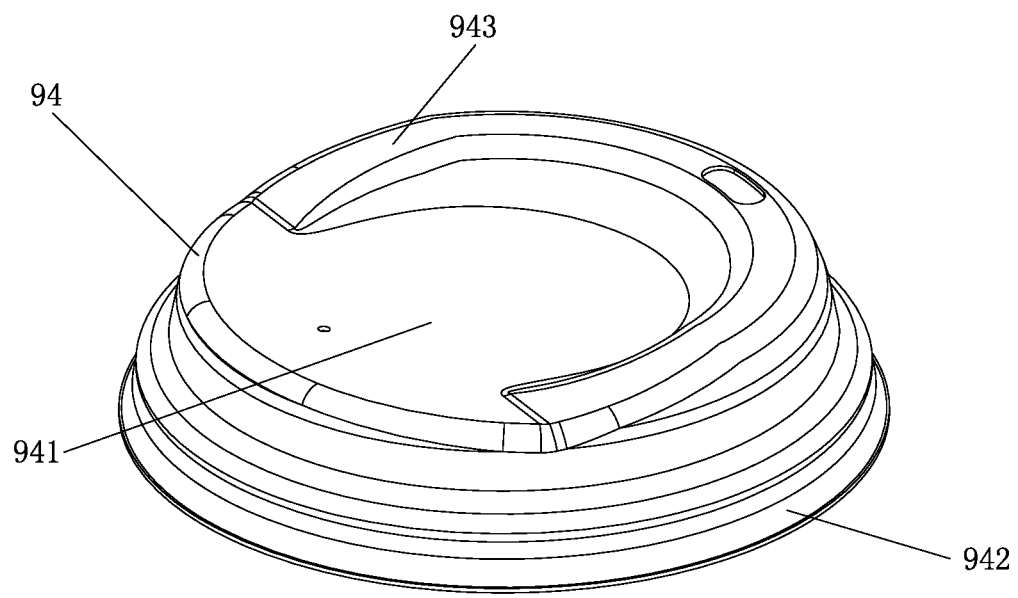
FIG. 13 is a perspective view of a respective one utensil made of plant fibers according to the preferred embodiment of the present invention.
Figure 14:
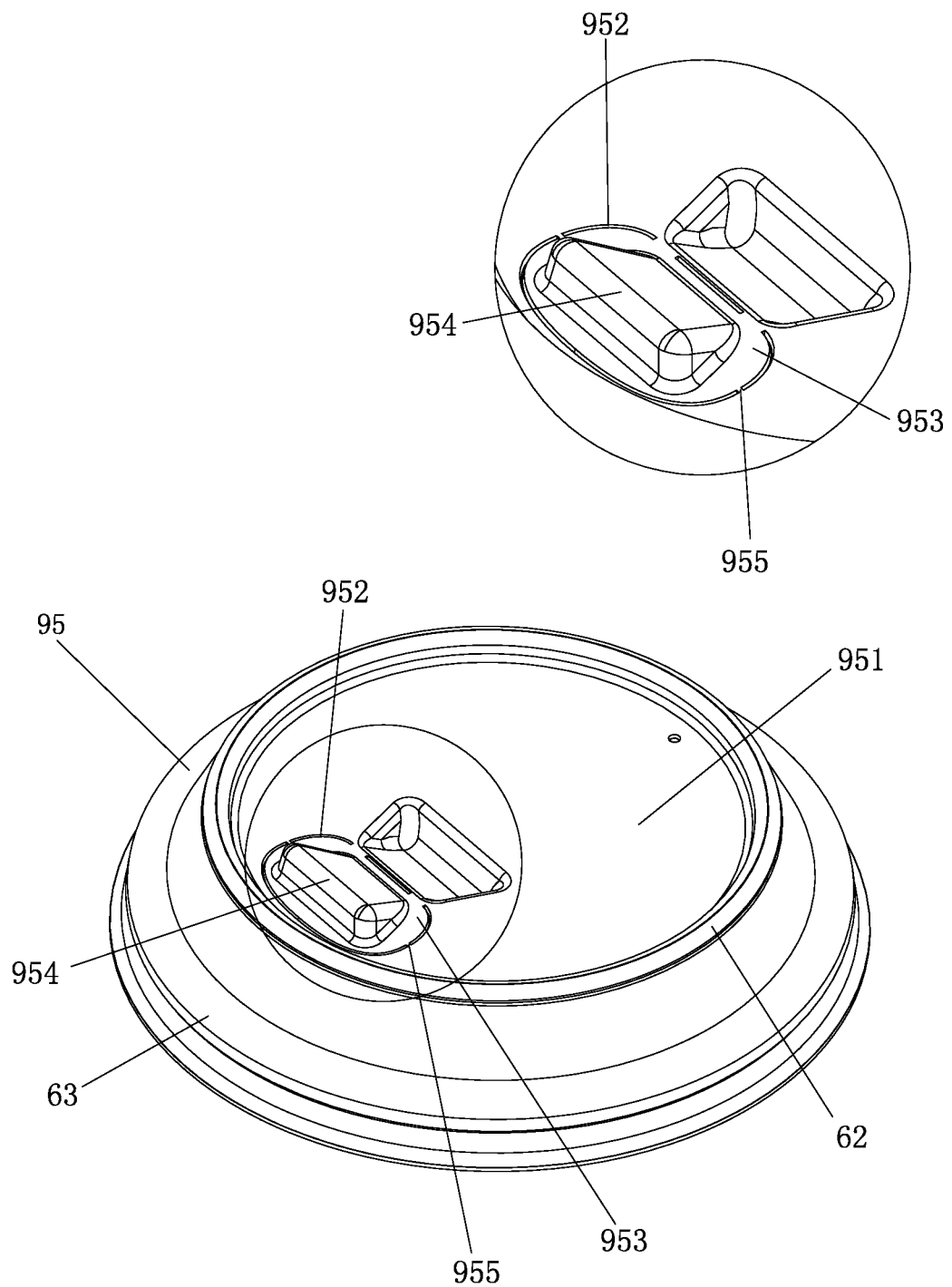
FIG. 14 is a perspective view of another respective one utensil made of plant fibers according to the preferred embodiment of the present invention.
Figure 15:
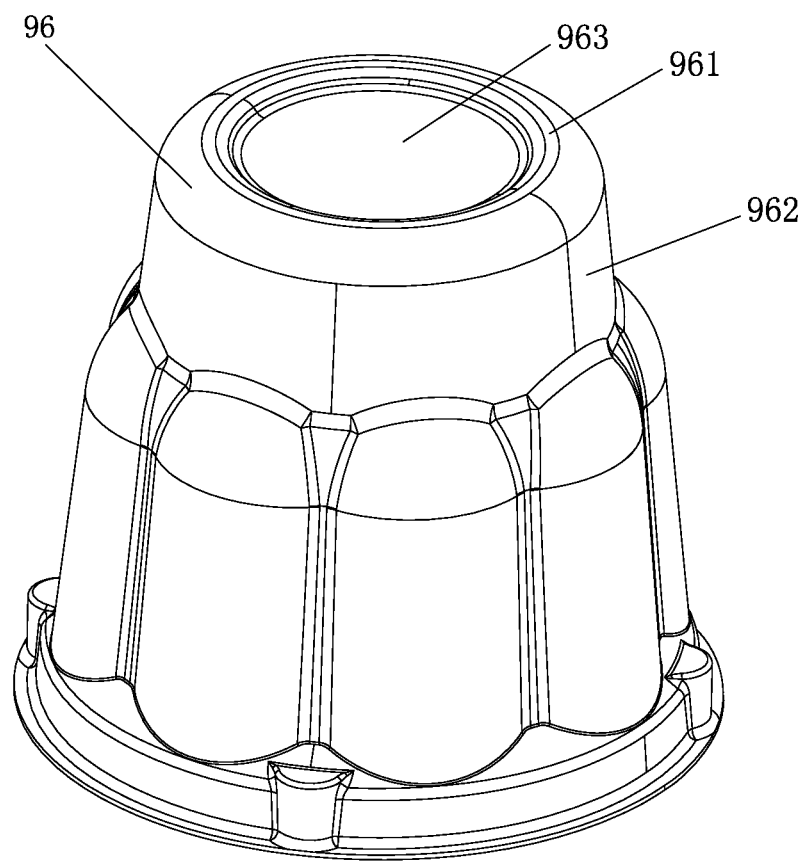
FIG. 15 is a perspective view of another respective one utensil made of plant fibers according to the preferred embodiment of the present invention.

Referring to FIG. 11, in another embodiment, the carrier 20 of the delivery device includes the first transport belt 2, the tilted slideway 3, a second transport belt 8 disposed on a discharge side of the tilted slideway 3, and a third camera 81 is arranged above the second transport belt 8.

With reference to FIGS. 11, 6 and 7, a method of checking the multiple utensils 1 by using the optical inspection equipment comprises steps of:

1) putting the multiple utensils 1, mouths of which face downward, wherein when the first transport belt 2 delivers the multiple utensils 1 above the first light source 25, the first light source 25 illuminates the multiple utensils 1 to be translucent, the first shooting device 6 shoots the image of the respective one utensil 1, and the image of the respective one utensil 1 is compared with a standard image so as to check an interior defect of the respective one lid 1 based on a change of a light, a shadow, and a brightness of the image of the at least one utensil 1, wherein the interior defect includes a crack, an uneven thickness, air bores, too thin or thick thickness.

2) delivering the multiple utensils 1 to the tilted slideway 3 by using the first transport belt, wherein the multiple utensils 1 drop freely from the tilted slideway 1, the second shooting device 7 shoots the image of the inner surface of the respective one utensil 1 via the transparent zone of the tilted slideway 3, and the image of the inner surface of the respective one utensil 1 is compared with the standard image so as to check a defect of the inner surface of the respective one utensil 1 and connection diameter, wherein the defect of the inner surface includes a dirty inner surface, unclear patterns of outer surface, a damage of the inner surface, and structural defect.

3) delivering the multiple utensils 1 to the second transport belt 8 by using the tilted slideway 3 so that when the multiple utensils 1 on the second transport belt 8 move below the third shooting device 81, the third shooting device 81 shoots the image of the outer surface of the respective one utensil 1, and the image of the outer surface of the respective one utensil 1 is compared with the standard image so as to check the defect of the outer surface of the respective one utensil 1, wherein the third shooting device 81 shoots the image of the outer surface of the respective one utensil 1, and the image of the outer surface of the respective one utensil 1 is compared with the standard image so as to check the defect of the outer surface of the respective one utensil 1, wherein the defect of the outer surface of the respective one utensil 1 is any one of dirt, unclear patterns, damages, and incomplete structure.

Thereby, the optical inspection equipment of the present invention is applied to check the respective one utensil (such as the cup lid 1 made of the plant fibers) and comprises: the carrier 20 fixed on the delivery device, at least one light source, at least one shooting device. The carrier 20 of the delivery device includes at least one transparent zone, the at least one shooting device includes the first shooting device 6, and the at least one light source includes the first light source 25 arranged on a side of the carrier 20, the first shooting device 6 is arranged on the other side of the carrier 20, such that when checking the respective one utensil 1 by using the optical inspection equipment, the respective one utensil 1 is delivered by the carrier 20 and is shot to be translucent by the first light source 25, then the first shooting device 6 of the carrier 20 shoots the image of the respective one utensil 1 to judge whether the interior defect of the respective one utensil 1 occur, wherein the at least one shooting device further includes the second shooting device 7 configured to shoot the image of the inner surface of the respective one utensil 1 via the transparent zone of the respective one carrier 20 so as to compared with the standard image, thus checking the inner surface and the interior defect of the respective one lid 1. Preferably, the top of the respective one utensil 1 is not drawn by the optical inspection equipment and is capable of checking the defect of the inner surface of the respective one utensil 1, thus checking the respective one utensil in the various shapes.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. Optical inspection equipment for checking multiple utensils made of plant fiber comprising:
   a delivery device configured to deliver the multiple utensils made of the plant fiber,
   at least one light source, and
   at least one shooting device configured to shoot an image;
   wherein the delivery device includes a carrier on which at least one transparent zone is defined, the at least one shooting device includes a first shooting device, the at least one light source includes a first light source located on a side of the carrier, such that the first light source illuminates a respective utensil and the first shooting device shoots an image of the respective utensil directly or via the transparent zone of the carrier;
   wherein the carrier comprises a tilted slideway configured to cause the multiple utensils to slide freely; and
   wherein the carrier of the delivery device further comprises a first transport belt, the first transport belt located on a feeding side of the tilted slideway, and the first transport belt and the tilted slideway include the transparent zone, wherein the first light source is arranged on an inner side of the first transport belt on which the multiple utensils are not disposed, and the first shooting device is arranged on an outer side of the first transport belt on which the multiple utensils are disposed, and the first shooting device is located above the first light source, wherein the at least one shooting device further includes a second shooting device which is arranged below a portion of the tilted slideway on which the multiple utensils are not disposed, and the first transport belt of the carrier is arranged on a discharge side of the tilted slideway.

2. The optical inspection equipment as claimed in claim 1, wherein the first transport belt includes multiple suction orifices spacedly formed on a top thereof, and the first transport belt further includes a shielding plate mounted above the first light source, wherein the shielding plate includes a through orifice defined thereon, such that the first light source illuminates the multiple utensils via the through orifice and the transparent zone of the first transport belt, so that illumination from the first light source is limited to a profile range of the multiple utensils; wherein the first transport belt further includes a suction device which has at least one casing, and the at least one casing is arranged on two sides of the first light source, wherein the at least one casing has at least one drawing hole defined thereon and configured to connect with an air sucking device, wherein the at least one casing has at least one elongated hole extending from a top thereof along a delivery direction of the multiple utensils, and the at least one elongated hole is located below the multiple suction orifices; the tilted slideway is arranged on a frame; and the second shooting device includes a third camera located below the frame.

3. The optical inspection equipment as claimed in claim 2, further comprising an air blowing device comprising a hollow cavity, the air blowing device including at least one air inlet defined on the hollow cavity and configured to connect to an air supply device, wherein the tilted slideway further includes multiple air blowing orifices spacedly defined on a bottom of the hollow cavity, such that the multiple air blowing orifices blow air onto tops of the multiple utensils so that the multiple utensils contact with the tilted slideway and are not removed from the tilted slideway.

4. The optical inspection equipment as claimed in claim 2, wherein the tilted slideway includes a direction guide structure disposed on an outer wall thereof, wherein the direction guide structure includes a first guiding plate and a second guiding plate which are fixed on a bottom of the hollow cavity, and the multiple air blowing orifices of the air blowing device are defined between the first guiding plate and the second guiding plate, wherein the first guiding plate has at least one first upward conducting sheet, and the second guiding plate has at least one second upward conducting sheet, wherein the tilted slideway, the hollow cavity, the first guiding plate, the second guiding plate, the first upward conducting sheet and the second upward conducting sheet define a first guide channel; wherein a fixing plate is configured to position two third guiding plates and two third upward conducting sheets on a wall of a bottom of the tilted slideway, wherein the two third upward conducting sheets are defined between the two third guiding plates, one third guiding plate has a first beveled piece extending from a top thereof, the other third guiding plate has a second beveled piece extending from a top thereof, and the fixing plate is connected with the frame; wherein a top of one third upward conducting sheet extends above the first upward conducting sheet, and a top of the other third upward conducting sheet extends above to the second upward conducting sheet, wherein the tilted slideway, the two third guiding plates, and the two third upward conducting sheets define a second guide channel; wherein the multiple utensils on the tilted slideway move across the first guide channel and the second guide channel sequentially.

5. The optical inspection equipment as claimed in claim 1, wherein the first shooting device includes a first camera configured to shoot an image of a top of the respective one utensil, a locating deck, and a vertical moving deck; the locating deck is connected with the vertical moving deck by using an adjustment mechanism, wherein the adjustment mechanism includes multiple bearing holders mounted on the locating deck, and each bearing holder has an upright shaft movably connected therein, wherein a bottom of each upright shaft is fixed on the vertical moving deck, and each upright shaft has a timing belt fitted thereon so that the multiple bearing holders are connected to obtain synchronous adjustment; wherein one upright shaft of the adjustment mechanism has a rotatable knob fixed on a top thereof and configured to be rotated to adjust a position and a height of the vertical moving deck, the vertical moving deck has an opening defined on a center thereof, and the vertical moving deck has at least one bracket configured to position the first camera above the opening; wherein the vertical moving deck has multiple second cameras configured to shoot an image of an external side of the respective one utensil, such that the rotatable knob of the adjustment mechanism is rotated to adjust the positions and the heights of the vertical moving deck, the multiple second cameras, and the first camera, wherein the first camera and the multiple second cameras of the first shooting device shoot the image of the respective one utensil.

\* \* \* \* \*